United States Patent [19]

Nilsson

[11] Patent Number: 5,686,000
[45] Date of Patent: Nov. 11, 1997

[54] DEVICE FOR CLEANSING WELDING TORCHES

[75] Inventor: Valter Nilsson, Västerås, Sweden

[73] Assignee: Swedtech AB, Vasteras, Sweden

[21] Appl. No.: 635,909

[22] PCT Filed: Oct. 26, 1994

[86] PCT No.: PCT/SE94/01007

§ 371 Date: Apr. 25, 1996

§ 102(e) Date: Apr. 25, 1996

[87] PCT Pub. No.: WO95/13162

PCT Pub. Date: May 18, 1995

[30] Foreign Application Priority Data

Nov. 8, 1993 [SE] Sweden ............... 9303665

[51] Int. Cl.⁶ ............................ B23K 9/32
[52] U.S. Cl. ............... 219/136; 15/93.1; 219/137.43
[58] Field of Search ................... 219/136, 125.1, 219/137.2, 137.43; 15/93.1; 901/42

[56] References Cited

U.S. PATENT DOCUMENTS

| | | | |
|---|---|---|---|
| 4,583,257 | 4/1986 | Bridges et al. | 15/93.1 |
| 4,702,195 | 10/1987 | Thielmann | 219/136 |
| 4,733,050 | 3/1988 | Grafius | 219/136 |
| 4,778,976 | 10/1988 | Litt et al. | 219/136 |
| 4,834,280 | 5/1989 | Thielmann | 219/137.2 |
| 4,935,598 | 6/1990 | Ward | 219/136 |
| 5,070,568 | 12/1991 | Wilcox et al. | 15/93.1 |
| 5,138,969 | 8/1992 | Thielmann | 219/137.2 |
| 5,221,826 | 6/1993 | Lee et al. | 219/136 |

FOREIGN PATENT DOCUMENTS

| | | | |
|---|---|---|---|
| 3244993 | 6/1984 | Germany . | |
| 211505 | 7/1984 | Germany . | |
| 233629 | 3/1986 | Germany . | |
| 59-73186 | 4/1984 | Japan | 219/137.43 |

Primary Examiner—Clifford C. Shaw
Attorney, Agent, or Firm—Young & Thompson

[57] ABSTRACT

The present invention relates to a device for automatically cleaning and curing off the wire in the nozzles of MIG/MAG welding equipment. It is characterized in that the device, which is portable, comprises a centering member (2) for insertion of a nozzle (1), and milling means (4, 5) to millcoated parts (6) of the nozzle, as well as possibly a cutting member (10) for the foremost part of the welding bead (7) of material applied, the milling means and cutting member if any (4, 5 and 10, respectively) being rotated by a drive means (3), designed to start automatically upon insertion of the nozzle (1).

6 Claims, 1 Drawing Sheet

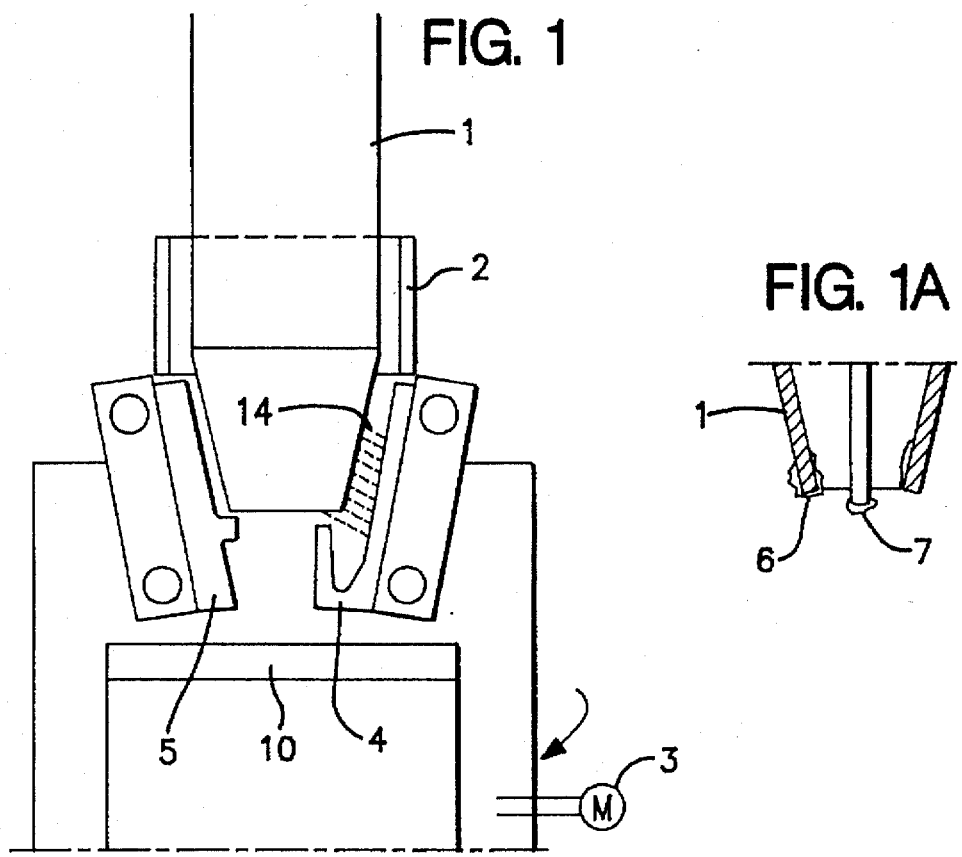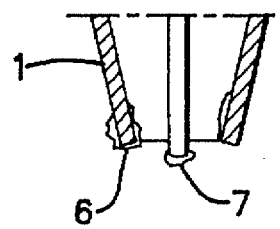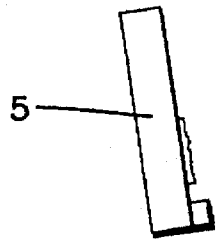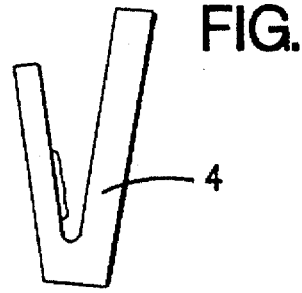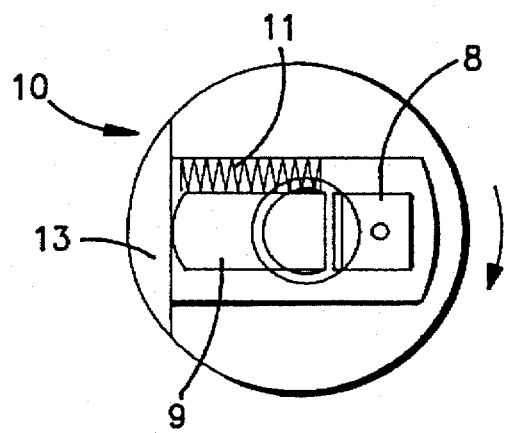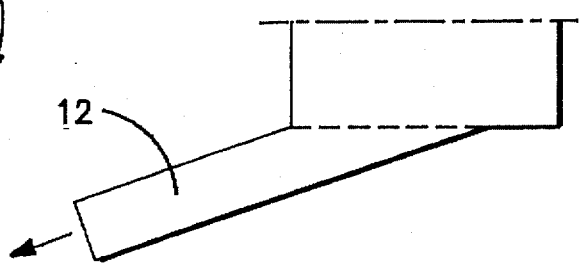

DEVICE FOR CLEANSING WELDING TORCHES

TECHNICAL FIELD

The present invention relates to a device for automatically cleaning and cutting off the wire in the nozzles of MIG/MAG welding equipment.

BACKGROUND ART

When welding with automatic and semi-automatic welding equipment spraying and splashing occurs in the nozzle, thereby preventing a uniform flow of the protective gas used during electric arc welding. Unless this problem is remedied the welding quality will gradually deteriorate, resulting in welding defects.

When performing MIG/MAG welding manually, the welding is stopped at regular intervals and the welding sleeve (gas hood) is manually cleaned using files, knives or the like, and a special wire brush. The welding bead is then cut off to give a suitable tip. Lumps and thickened portions often occur at the tip, which should preferably be avoided. The aim is thus to prevent welding defects at the starting instant. A welding spray is applied to inhibit further coating. However, this welding spray does not completely prevent coating but only provides protection for a limited period.

In the case of automatic welding by robots the problem is greater since the welding process must be interrupted and sometimes the welding programme must be restarted after cleaning. A few specially designed cleaning machines are commercially available but it is difficult to fit them into the entire cleaning process, including spraying and bead cutting. No procedure that performs these steps simultaneously is commercially available. It is known per se to mill off such deposits, but not in combination with other necessary steps.

SUMMARY OF THE INVENTION

The present invention aims at solving the above-mentioned and associated problems and is characterized in that the device, which is portable, comprises a centering member for insertion of a nozzle, and milling means to mill coated parts of the nozzle, as well as possibly a cutting member for the foremost part of the welding bead of material applied, the milling means and cutting member if any being rotated by a drive means designed to start automatically upon insertion of the nozzle.

This equipment enables the time required for the entire cleaning and cutting process to be greatly reduced (to 4–5 seconds), while enabling this cleaning process to be introduced into the welding cycle at pre-programmed intervals.

BRIEF DESCRIPTION OF THE DRAWINGS

An example of the invention is illustrated in the accompanying drawings in which:

FIG. 1 shows the device from the side;

FIG. shows 1A welding nozzle coated with welding deposits;

FIGS. 2 and 3 show two milling members;

FIG. 4 shows a cutting member and;

FIG. 5 shows feedout means for waste material.

PREFERRED EMBODIMENT

FIG. 1 shows a welding nozzle (1) which is inserted into a centering member (2), whereupon a drive means (3) such as a pneumatic or electric motor starts and drives two or more milling means (4, 5).

FIG. 1A shows a welding nozzle (1) coated with inner and outer deposits (6). A welding bead (7), thickened or coated at the front end can also be seen in this figure.

The milling means (4, 5) are rotated around the nozzle (1) and are shaped both (FIG. 1) for machining the inner deposits in the lower part of the nozzle and also (FIG. 2) the outer deposits and deposits on the front of the nozzle (components 4 and 5, respectively, in FIGS. 1–3).

The invention also includes a cutting member (10) to simultaneously cut off the foremost part of the welding bead, see FIG. 4. This cutting member is suitably rotated at the same time as the milling means, but may also rotate separately. It comprises two cutters, one which is fixed in radial direction (8) and one which is movable in radial direction (9). The movable cutter is influenced during the rotation by a cam disc (13) or the like towards and away from the fixed cutter (8), against the action of a spring (11). The front part of the bead (7) is thus cut off. FIG. 5 shows a waste trough lowermost in the device (12), for material machined off.

The device operates as follows:

When the nozzle (1) has become coated ("dirty") it is inserted in the cleaner and the automatic milling means (4, 5) starts up and scrapes the nozzle clean and an exact length of the protruding welding bead is cut off. In the meanwhile welding spray 14 is applied around the nozzle in order to prevent splashed welding material from adhering. The blast air is also utilized to blow the machine clean in order to prevent disturbances in operation.

The invention can be varied in many ways within the scope of the appended claims.

I claim:

1. A device for automatically cleaning and cutting off the wire in the nozzles of MIG/MAG welding equipment, characterized in that the device comprises a centering member (2) for insertion of a nozzle (1), and milling means (4, 5) to mill coated parts (6) of the nozzle, as well as a cutting member (10) for the foremost part of a welding bead (7) of material applied to the wire, the milling means and cutting member (4, 5 and 10, respectively) being rotated about a longitudinal axis by a drive means (3) upon insertion of the nozzle (1), said milling means being stationary in the direction of said longitudinal axes, the cutting member (10) comprising two cutters (8, 9), one (8) which is radially fixed, relative to said longitudinal axis, and one (9) which is radially movable, relative to said longitudinal axis, to and from a cutting position with the aid of a cam disc (13) or the like which influences the moveable cutter during the rotation of the milling means and cutting member.

2. A device as claimed in claim 1, characterized in that the milling means (4, 5) are at least two in number, one (4) for the inner exposed part (6) of the nozzle and one primarily for its outer exposed part and its foremost part, milling occurring during the rotation.

3. A device as claimed in claim 2, characterized in that the drive means consists of a pneumatic motor (1).

4. A device as claimed in claim 1, characterized in that the drive means consists of a pneumatic motor (1).

5. A device as claimed in claim 1 further including means for applying a welding spray to the nozzle.

6. A device as claimed in claim 1 wherein said drive means comprises means for automatically starting said drive means upon said insertion of said nozzle.

* * * * *